United States Patent [19]

Kamiyama

[11] Patent Number: 5,584,018
[45] Date of Patent: Dec. 10, 1996

[54] INFORMATION MEMORY APPARATUS HAVING A PLURALITY OF DISK DRIVES AND CALCULATING AND RE-ALLOCATING DATA ACCORDING TO ACCESS FREQUENCY

[75] Inventor: Tadanobu Kamiyama, Yokosuka, Japan

[73] Assignee: Kabushiki Kaisha Toshiba, Kawasaki, Japan

[21] Appl. No.: 305,950

[22] Filed: Sep. 15, 1994

[30] Foreign Application Priority Data

Sep. 24, 1993 [JP] Japan .................. 5-238437

[51] Int. Cl.⁶ .................. G06F 12/02; G06F 13/00
[52] U.S. Cl. .................. 395/492; 395/439; 395/441; 395/448; 395/488; 364/DIG. 1
[58] Field of Search .................. 395/439, 441, 395/492, 483, 488

[56] References Cited

U.S. PATENT DOCUMENTS 4,542,458  9/1985  Kitajima et al. .................. 395/441
5,068,842  11/1991  Naito .................. 369/32
5,155,835  10/1992  Belsan .................. 395/441
5,355,475  10/1994  Tanaka et al. .................. 395/600

OTHER PUBLICATIONS

Nikkei Electronics, Apr. 15, pp. 153–160, 1991.
Nikkei Electronics, Apr. 26, pp. 77–103, 1993.

*Primary Examiner*—Frank J. Asta
*Attorney, Agent, or Firm*—Cushman, Darby & Cushman

[57] ABSTRACT

An information memory apparatus for reading/writing information from/in a plurality of detachable information storage media such as optical disks includes a storage section for calculating and storing the access frequencies of data stored in the plurality of media loaded in the apparatus, an identifying section for identifying rarely accessed data of the data stored in the access frequency storage section, and centralized relocation section for performing centralized relocation of the rarely accessed data in a specific medium of the plurality of media. The limit of the storage capacity of a system based on a fixed disk (undetachable disk) unit is theoretically eliminated.

5 Claims, 12 Drawing Sheets

FIG. 8

| TOTAL DATA COUNT | | | | | |
|---|---|---|---|---|---|
| TOTAL DATA BYTE COUNT | | | | | |
| DATA ID | DATA SIZE | ACCESS FREQUENCY | CHANGE FLAG | STORAGE MEDIUM (LOCATION) | |
| | | 21 | 22 | 23 | |
| | | | | | |
| | | | | | |
| | | | | | |

CENTRALIZED RELOCATION SECTION
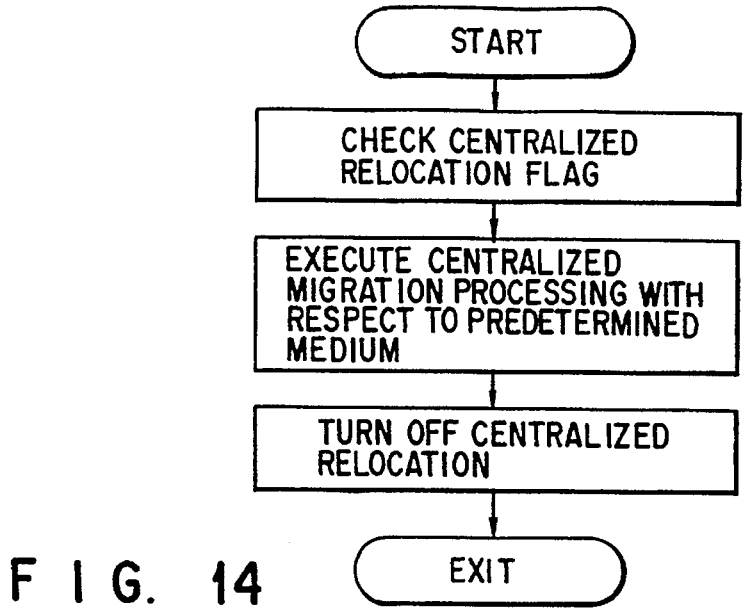
F I G. 14
MEDIA UPDATE CONTROL SECTION
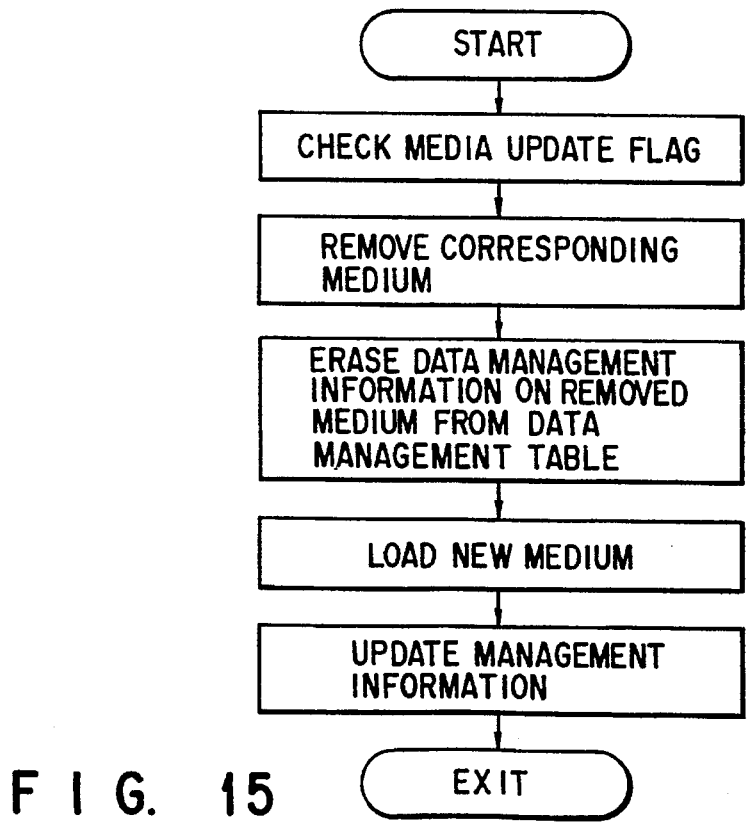
F I G. 15

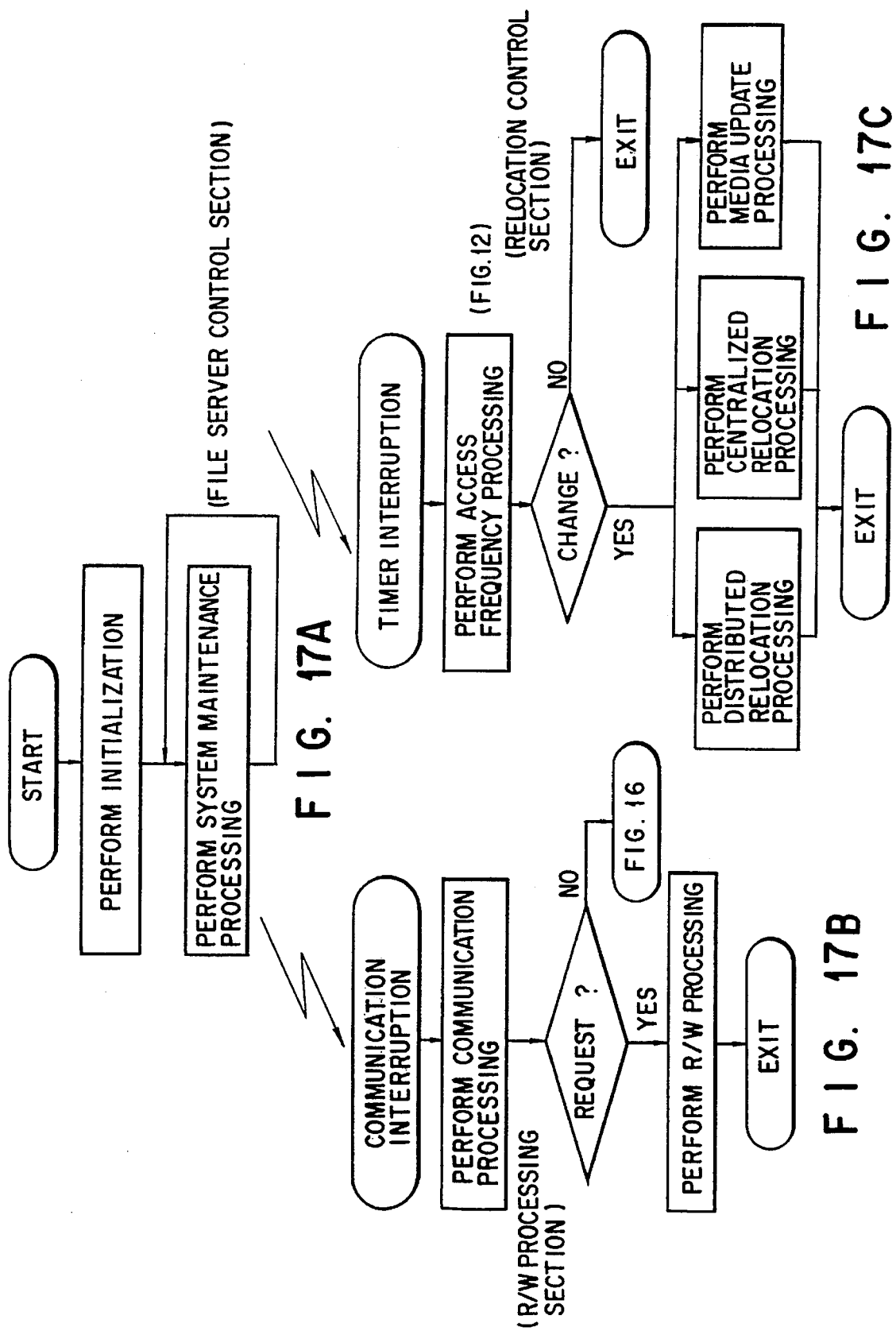

INFORMATION MEMORY APPARATUS HAVING A PLURALITY OF DISK DRIVES AND CALCULATING AND RE-ALLOCATING DATA ACCORDING TO ACCESS FREQUENCY

BACKGROUND OF THE INVENTION

1. Field of the Invention

The present invention relates to an information memory apparatus and, more particularly, to an information memory apparatus having a plurality of disk drives.

2. Description of the Related Art

Memories have been studied and developed enormously to achieve a large storage capacity and a high processing speed. For example, as disclosed in NIKKEI ELECTRONICS, Apr. 26, pp. 77–103, 1993, a great deal of attention has been paid to a technique of achieving high performance and high reliability by arranging a magnetic memory and the like for parallel processing. Such a system has been put into practice. Since this system basically uses a fixed disk (unportable disk) unit as an information storage medium, the storage capacity of the system is limited by the size of hardware prepared in advance. For this reason, as disclosed in NIKKEI ELECTRONICS, Sep. 15, pp. 153–160, 1991, if a request is generated to store data exceeding the storage capacity of a system, unnecessary data are erased, or data exhibiting low access request levels are backed up to a portable medium such as a floppy disk, thereby setting a free area in a fixed disk unit.

As described above, in a system based on a fixed disk unit such as a hard disk unit, the storage capacity is limited by the size of hardware. If both a fixed disk and portable disks are used, the system cost increases, and the operation of the system is complicated, making it difficult to use the system.

SUMMARY OF THE INVENTION

It is, therefore, an object of the present invention to theoretically eliminate the limit of the storage capacity of a system based on a fixed disk unit by using portable disks as basic storage media, forming a disk array for parallel processing to achieve high performance, and changing the operation management of stored data and media.

It is another object of the present invention to provide a practical system in which automatic relocation processing of data is sequentially performed under the control of the system, thereby preventing large-scale data relocation processing immediately before a disk which is full is replaced and greatly facilitating a system operation.

It is still another object of the present invention to provide a very inexpensive system using conventional portable disks.

In order to achieve the above objects, according to the first aspect of the present invention, there is provided an information processing apparatus for executing data access to a plurality of disks, comprising: first calculating means for calculating access frequencies of data stored in the plurality of disks; memory means for storing the access frequencies of the data calculated by the first calculating means; second calculating means for calculating a total amount of the data stored in the plurality of disks; and processing means for restoring data of low access frequency on one disk of the plurality of disks to centralize data of low access frequency on one disk in accordance with the access frequencies stored in the memory means and the total amount of the data stored in the plurality of disks calculated by the second calculating means.

According to a second aspect of the present invention, there is provided an information processing apparatus for executing data access to a plurality of disks, comprising: first calculating means for calculating access frequencies of data stored in the plurality of disks; memory means for storing the access frequencies of the data calculated by the first calculating means; second calculating means for calculating a total amount of the data stored in the plurality of disks; first processing means for re-storing data of low access frequency on one disk of the plurality of disks to centralize data of low access frequency on the one disk in accordance with the access frequencies stored in the memory means and the total amount of the data stored in the plurality of disks calculated by the second calculating means; and second processing means for distributing data of high access frequency on the plurality of disks so as to distribute data of high access frequency on the plurality of disks in accordance with the access frequencies stored in the memory means and the total amount of the data stored in the plurality of disks, which is calculated by the second calculating means.

According to a third aspect of the present invention, there is provided an information processing apparatus for executing data access to a plurality of disks, comprising: first calculating means for calculating access frequencies of data stored in the plurality of disks; memory means for storing the access frequencies of the data calculated by the first calculating means; second calculating means for calculating a total amount of the data stored in the plurality of disks; means for comparing each access frequency of the data stored in the plurality of disks with a reference value set on a basis of the access frequencies stored in the memory means; first defining means for defining the data, as data of low access frequency, which exhibits access frequency smaller than the reference value as a result of comparison performed by the comparison means; second defining means for defining the data, as data of high access frequency, which exhibits access frequency larger than the reference value as a result of comparison performed by the comparison means; first processing means for re-storing data defined as data of low access frequency by the first defining means on one of the plurality of disks so as to centralize the data of low access frequency on the one disk in accordance with the total amount of the data stored in the plurality of disks calculated by the second calculating means; and second processing means for distributing data of high access frequency defined by the second defining means on the plurality of disks so as to distribute data of high access frequency on the plurality of disks in accordance with the total amount of data stored in the plurality of disks, which is calculated by the second calculating means.

The access frequencies of data stored in a plurality of disks are calculated. Data migration is made between the disks in accordance with the access frequencies of the data. Data exhibiting low access frequencies are centralized and stored in one medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8 is a view showing a data management table;

FIG. 14 is a flow chart showing the operation of a centralized relocation section;

FIG. 15 is a flow chart showing the operation of a media update control section;

FIGS. 17A to 17C are flow charts respectively showing the operations of a file server control processing section, an R/W processing section, and a relocation control section.

DETAILED DESCRIPTION OF THE PREFERRED EMBODIMENTS

Figure 1:
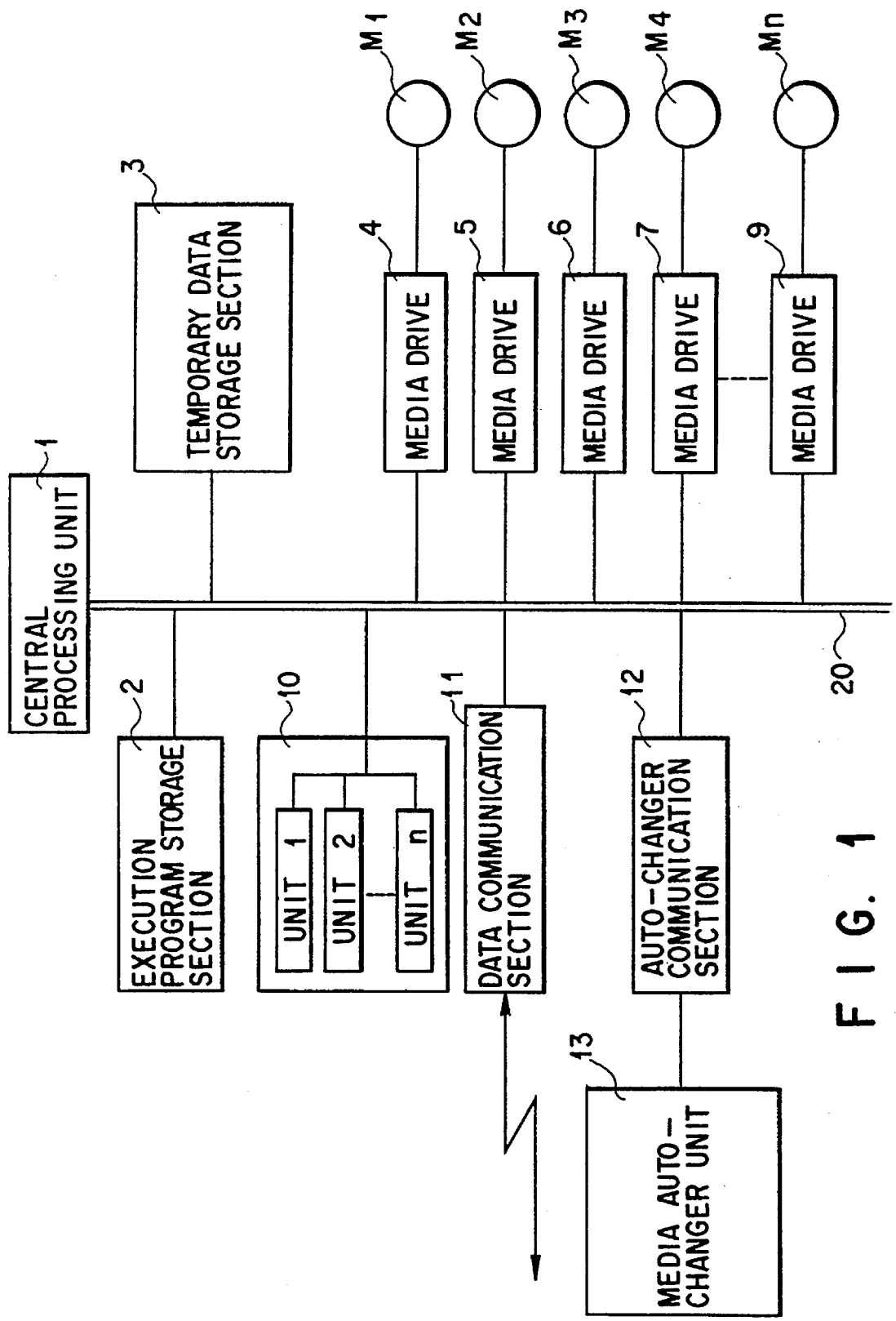
FIG. 1 is a block diagram showing the schematic arrangement of an information memory apparatus according to an embodiment of the present invention.

FIG. 1 shows the schematic arrangement of a file server system, i.e., an information memory apparatus, according to an embodiment of the present invention. A central processing unit (to be referred to as a CPU hereinafter) 1 controls the overall system and performs data management in accordance with programs stored in an execution program storage section (to be referred to as a program memory hereinafter) 2.

R/W (read/write) operations with respect to portable (detachable) storage media M1 to Mn are performed by media drives 4 to 9. Data transfer processing between a temporary data storage section 3 and the media drives 4 to 9 is performed by a data transfer section 10 such as a DMA unit. The data transfer section 10 incorporates a plurality of paths (channels) and a plurality of DMA units 1 to n for controlling the respective paths. Apparent parallel execution of the above data transfer operations can be performed by using the media drives 4 to 9. That is, the media M1 to Mn can be simultaneously accessed. Data is transmitted/received between this system and an external system via a data communication section 11. Transmission/reception data is read/written from/in the temporary data storage section 3 by the data transfer section 10. Replacement of a medium is performed by an auto-changer communication section 12 under the control of the CPU 1.

Figure 2:
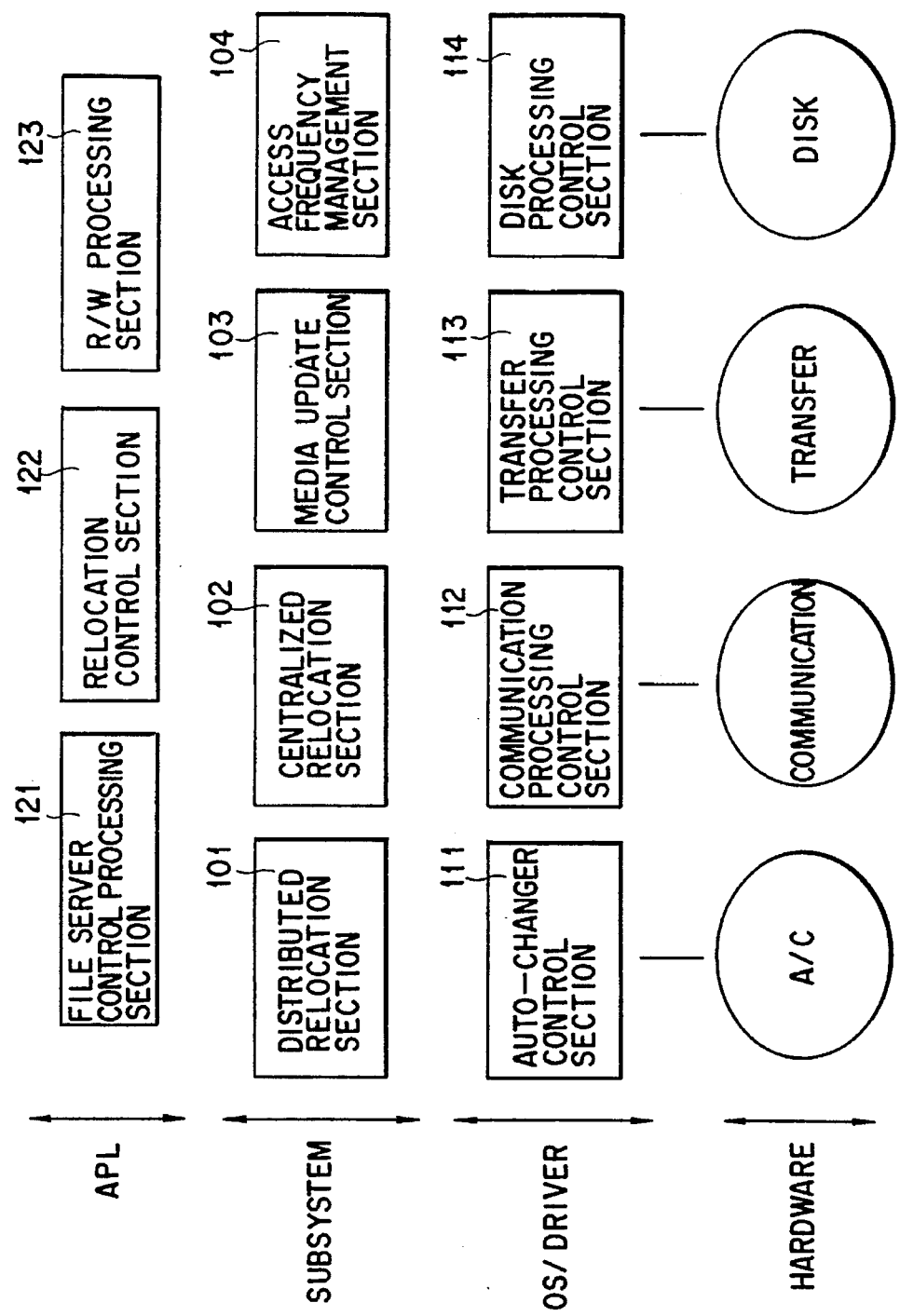
FIG. 2 is a block diagram showing the hierarchical structure of control software according to the embodiment.

FIG. 2 shows the control software arrangement of this embodiment. As shown in FIG. 2, this arrangement has a hierarchical structure. A file server control processing section 121, a relocation control section 122, and a R/W processing section 123 are application programs for performing system maintenance processing, data relocation processing, and data read/write processing, as will be described later.

An access frequency management section 104 measures the access frequencies of the data respectively stored in the media M1 to Mn and manages the measurement results. In addition, the access frequency management section 104 sorts the data in accordance with the access frequencies, performs distinction between frequently accessed data and rarely accessed data, determines whether to perform migration of data, and determines whether to replace a medium. A distributed relocation section 101 performs distributed relocation of frequently accessed data in the portable media M1 to Mn. A centralized relocation section 102 performs centralized relocation of rarely accessed data in some of the media M1 to Mn. A media update control section 103 removes a predetermined portable medium when it is full of only rarely accessed data, and loads, in place of the removed medium, a new medium in which no data is written.

An auto-changer control section 111, a communication processing control section 112, a transfer processing control section 113, and a disk processing control section 114 are drive software for directly controlling the respective hardware units, i.e., the auto-changer communication section 12, the data communication section 11, the data transfer section 10, and the media drives 4 to 9.

Figure 3A:
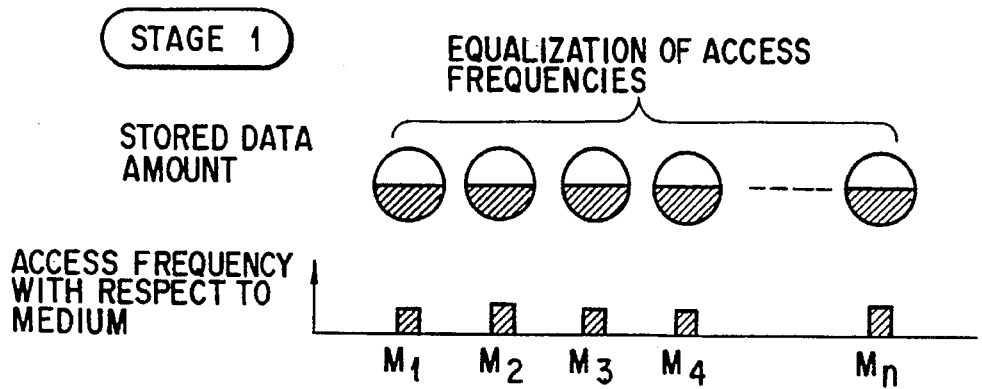
FIGS. 3A to 3C are views showing the basic concept of the present invention.
Figure 3B:
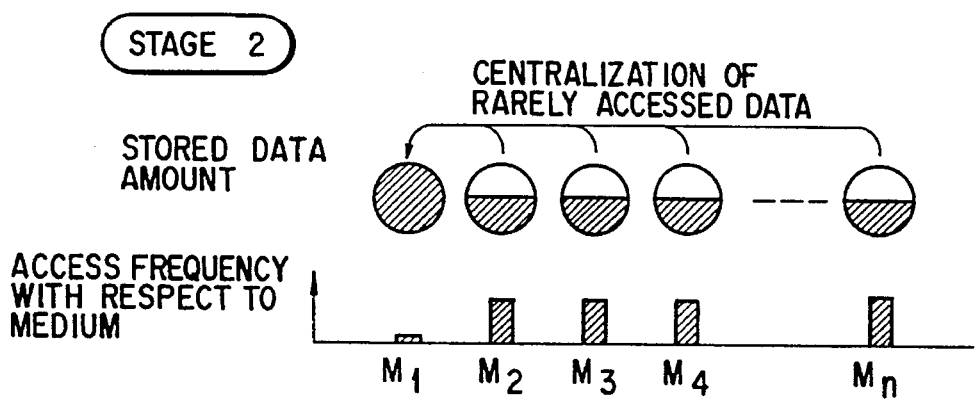
Figure 3C:
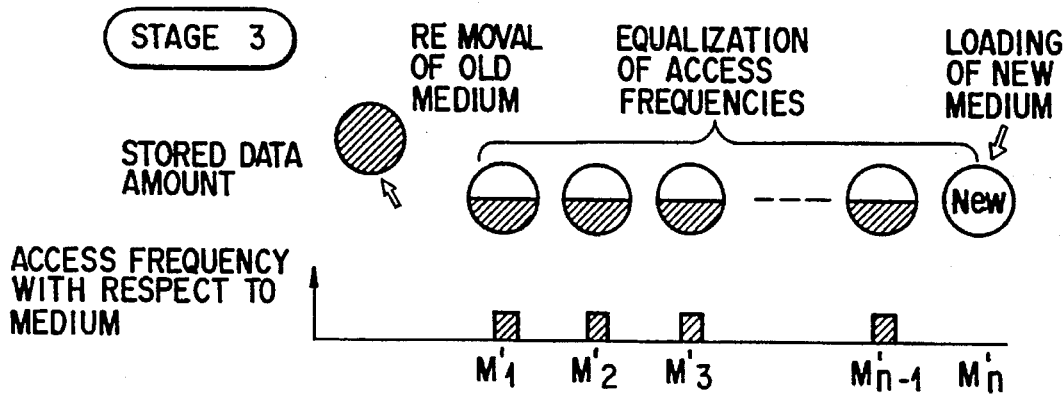

FIGS. 3A to 3C show the basic principle of the present invention. In performing parallel processing with respect to a plurality of media, the total access time can be shortened by performing distributed storage of frequently accessed data in a plurality of media, instead of performing centralized storage of the frequently accessed data in one medium to cause centralization of access thereto. As frequently accessed data increases in amount, the effect of this parallel processing improves.

This effect is not applied to data accessed at low frequencies. In removing a disk when it is full of data, only rarely accessed data are preferably stored in the removed disk because access to the removed media can be suppressed.

FIG. 3A shows a case wherein the remaining storage capacity is sufficiently large. In this case, it is desirable that data, mainly frequently accessed data, be distributed and stored in the respective media, and the access frequencies of the respective media be equalized. Therefore, new data need to be stored on the basis of equalization of stored data amounts. In addition, when the access frequencies of some of the respective media unevenly increase as time elapse, migration of data needs to be performed to equalize the access frequencies.

FIG. 3B shows a case wherein the total stored data amount exceeds a predetermined amount to necessitate a preparation for medium replacement. This illustration shows that centralized/migration of rarely accessed data is being performed with respect to the medium M1 to be removed. FIG. 3C shows a state wherein the above centralized/ migration has been executed, and the medium has been replaced.

Figure 4:
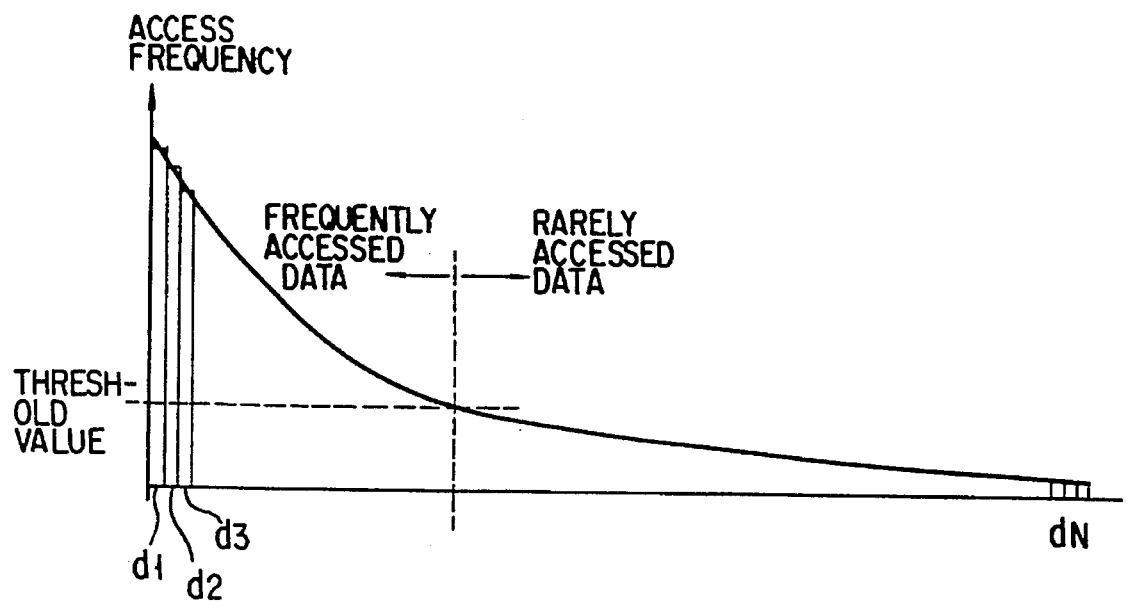
FIG. 4 is a graph for explaining distinction between frequently accessed data and rarely accessed data.

FIG. 4 is a graph for explaining distinction between frequently accessed data and rarely accessed data. Stored data are sorted in the order of access frequencies. Data exhibiting an access frequency exceeding a predetermined threshold value is managed as frequently accessed data, and data exhibiting an access frequency lower than the predetermined threshold is managed as rarely accessed data. For example, this management information is expressed as a table, as shown in FIG. 8.

Figure 5:
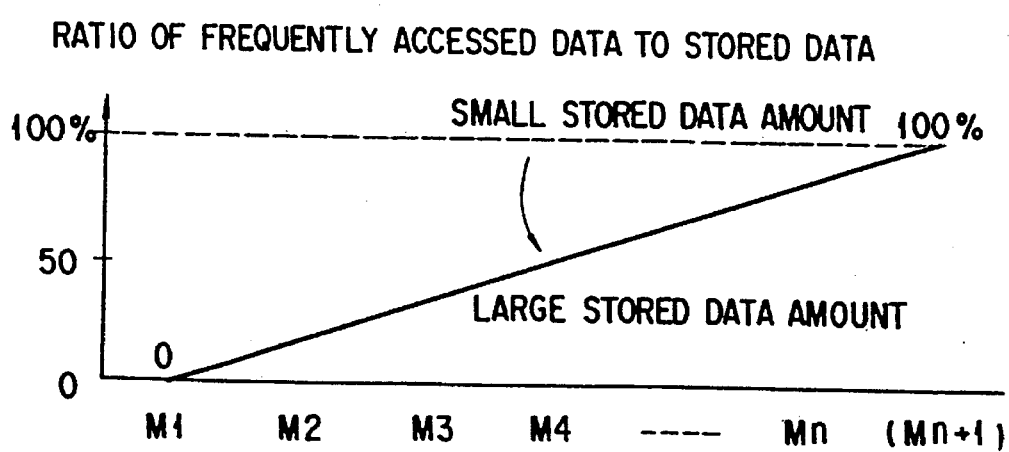
FIG. 5 is a graph showing the ratio of frequently accessed data to the data stored in each medium.

The basic concept of the present invention has been described above with reference to FIGS. 3A to 3C. Assume that centralized/migration of rarely accessed data is performed immediately before a medium is replaced. In this case, if the medium has a large capacity like an optical disk, a large amount of data is subjected to migration, and it takes much time to perform data migration. In order to prevent this, it is important that the above centralized/migration be sequentially executed in accordance with the amount of the stored data so as to gradually shift the state shown in FIG. 3A to the state shown in FIG. 3C. Assume that there are n media, i.e., media M1 to Mn, as shown in FIG. 5. In this case, data is desirably stored in the following manner. When the total amount of stored data is small, the data are evenly stored in the respective media. As the amount of stored data increases, frequently accessed data is gradually migrated from the medium M1, and rarely accessed data gradually occupy the medium M1.

Figure 6:
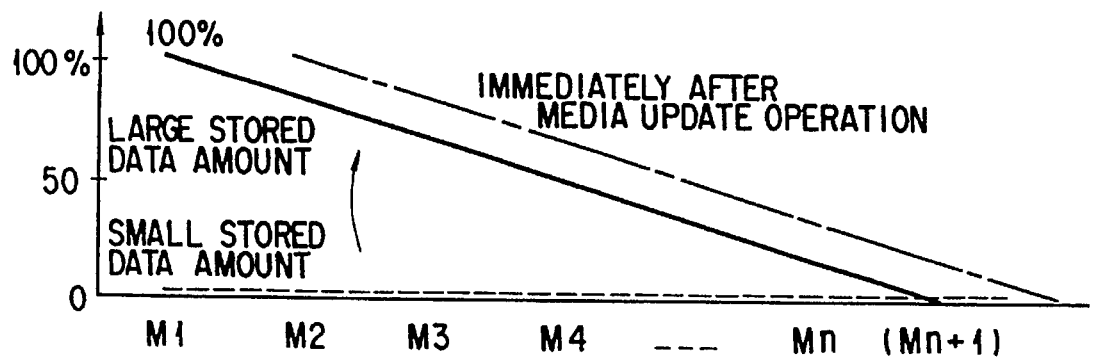
FIG. 6 is a graph showing the ratio of the amount of stored data to the capacity of each medium in a media update operation.

At the same time, for example, a storage gradient like the one shown in FIG. 6 is set for the media M1 to Mn, and the point of time when the medium M1 becomes full of data is defined as the time of medium replacement. In this case, control is desirably performed to set the data distribution ratio (the solid line in FIG. 5) at the point of time when the amount of stored data is large, as shown in FIG. 5.

FIGS. 5 and 6 virtually show a new medium Mn+1. When the above form of storage is realized, the storage gradient can be translated by simply replacing the medium M1 with the medium $M_{n+1}$. Referring to FIG. 6, the chain line indicates a state wherein data are stored in the medium M2 up to 100% after the medium M1 is replaced.

Letting μ be the ratio of the total amount of currently stored data to the sum of the stored data amounts of the respective media at the time of medium replacement (the solid line in FIG. 6), i.e., the total amount of stored data at the time of medium replacement, Si be the ratio of amount of the currently stored data of a medium i to the maximum amount of stored data of the medium i, and γHi be the ratio of frequently accessed data in the medium i to the stored data in the medium i, then Si and γHi can be generally expressed as functions of μ and i, as follows:

$$Si = f(\mu, i) \quad (1)$$

$$\gamma Hi = g(\mu, i) \quad (2)$$

$$\gamma Li = 1 - g(\mu, i) \quad (3)$$

Note that γLi is the ratio of rarely accessed data in the medium i to the stored data in the medium i. The functions f and g may have any forms within the gist of the present invention as long as they have the characteristics shown above and in FIGS. 5 and 6. In this case, for the sake of descriptive convenience, the form of storage employed by the present invention will be described below with reference to the functions f and g expressed as linear functions of μ and i as in the form shown in FIGS. 5 and 6.

Figure 9:
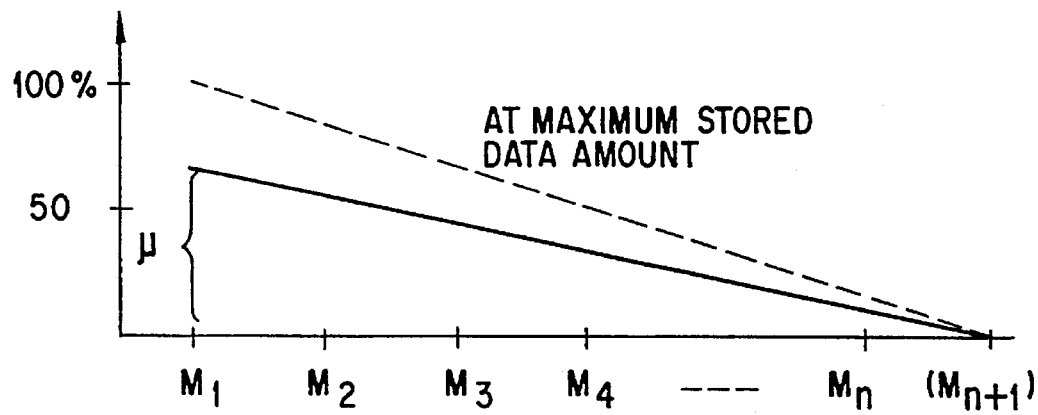
FIG. 9 is a graph showing the ratio of the amount of stored data to the capacity of each medium.

Referring to FIG. 9, if a ratio S1 of the stored data amount of the medium M1 at the time when the ratio of the total amount of stored data is μ is represented by μ, and a linear function for always setting a ratio Sn+1 of the stored data amount of the virtual medium Mn+1 to be 0 is a function f, then the function f, i.e., Si, is expressed as $$Si = f(\mu, i) = \mu \left( 1 - \frac{i-1}{n} \right) \quad (4)$$

Figure 10:
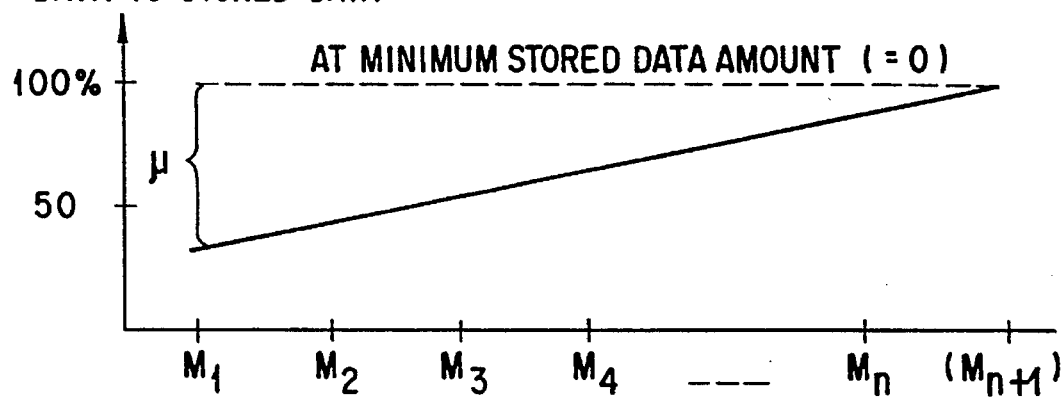
FIG. 10 is a graph showing the ratio of frequently accessed data to the data stored in each medium.

Similarly, referring to FIG. 10, if a ratio γH1 of frequently accessed data in the medium M1 at the time when the ratio of the total amount of stored data is μ is represented by (1−μ), and a linear function for always setting a ratio Hn+1 of frequently accessed data in the virtual medium Mn+1 to be 1 is a function g, then the function g, i.e., γHi, and "γHi" are expressed as $$\gamma Hi = g(\mu, i) = \frac{\mu}{n} (i-1) + (1-\mu) \quad (5)$$

$$\gamma Li = \frac{\mu}{n} (1-i) + \mu \quad (6)$$

If data are stored in accordance with the above equations, a sum total $S_{TOTALmax}$ of the stored data amounts of the respective media at the time of medium replacement is expressed as follows:

$$S_{TOTALmax} = \Sigma S_{imax} \quad (7)$$

$$= \sum_{\mu=1}^{n} \mu \left( 1 - \frac{i-1}{n} \right) \quad (8)$$

$$= \frac{n+1}{2} \quad (9)$$

Therefore, if the total amount of stored data of the respective media at each time point is represented by $S_{TOTAL}$, μ is given by the following equation:

$$\mu = \frac{S_{TOTAL}}{S_{TOTALmax}} = \frac{2 \cdot S_{TOTAL}}{n+1} \quad (10)$$

Accordingly, an amount Hi of frequently accessed data stored in each medium, and an amount Li of rarely accessed data stored in each medium are expressed as $$Hi = \mu \left( 1 - \frac{i-1}{n} \right) \left\{ \frac{\mu}{n} (i-1) + (1-\mu) \right\} \quad (11)$$

$$Li = \mu \left( 1 - \frac{i-1}{n} \right) \left\{ -\frac{\mu}{n} (i-1) + \mu \right\} \quad (12)$$

Figure 7:
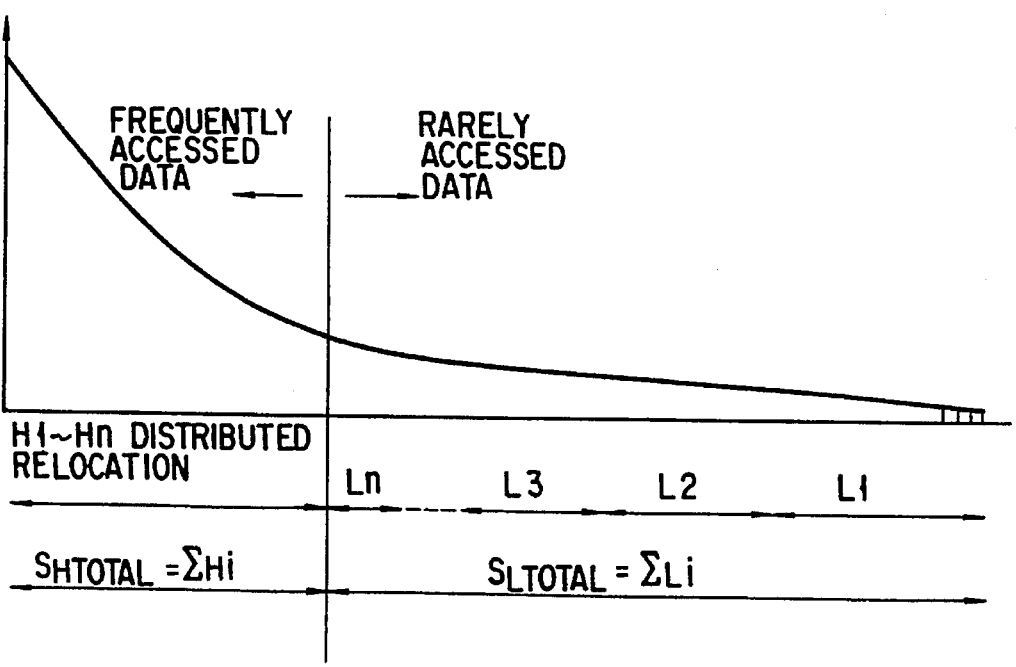
FIG. 7 is a graph showing data sorted in accordance with access frequencies.

Therefore, determination as to which data of the total amount $S_{TOTAL}$ of data stored in each medium at each time point are frequently accessed data and which data are rarely accessed data is performed on the basis of a sum total $S_{HTOTAL}$ of the amounts Hi of frequently accessed data stored in the respective media at each time point, obtained from equation (11), $$S_{HTOTAL} = \Sigma Hi \quad (13)$$

a sum total $S_{LTOTAL}$ of the amounts Li of rarely accessed data stored in the respective media at each time point, obtained from equation (12), $$S_{LTOTAL} = \Sigma Li \quad (14)$$

and, the sum total $S_{TOTAL}$ of the stored data amounts of the respective media. More specifically, as shown in FIG. 7, of all the data sorted in accordance with the access frequencies, data exhibiting relatively high access frequencies and coinciding with $S_{HTOTAL}$ (ΣHi) in data amount are classified as frequently accessed data, and the remaining data, i.e., the data corresponding to $S_{LTOTAL}$ are classified as rarely accessed data. The rarely accessed data are stored in the respective media in the order of increasing access frequency in accordance with the rarely accessed data stored amounts Li determined for the respective media. Meanwhile, the frequently accessed data are stored in the respective media in accordance with the frequently accessed data stored amounts Hi determined for the respective media. In this case, the frequently accessed data are distributed and stored in the respective media to prevent centralization of access to one medium.

Figure 11A:
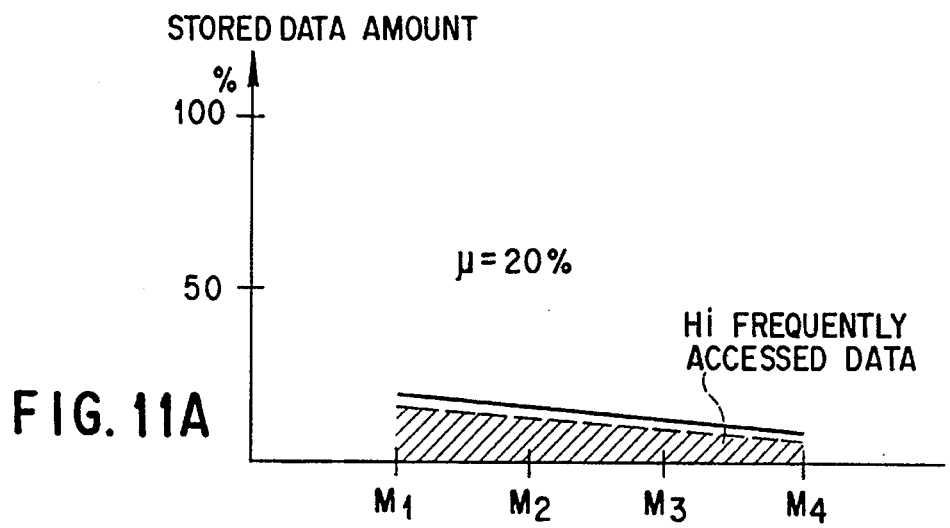
FIGS. 11A to 11C are graphs showing changes in the amount of rarely accessed data stored.
Figure 11B:
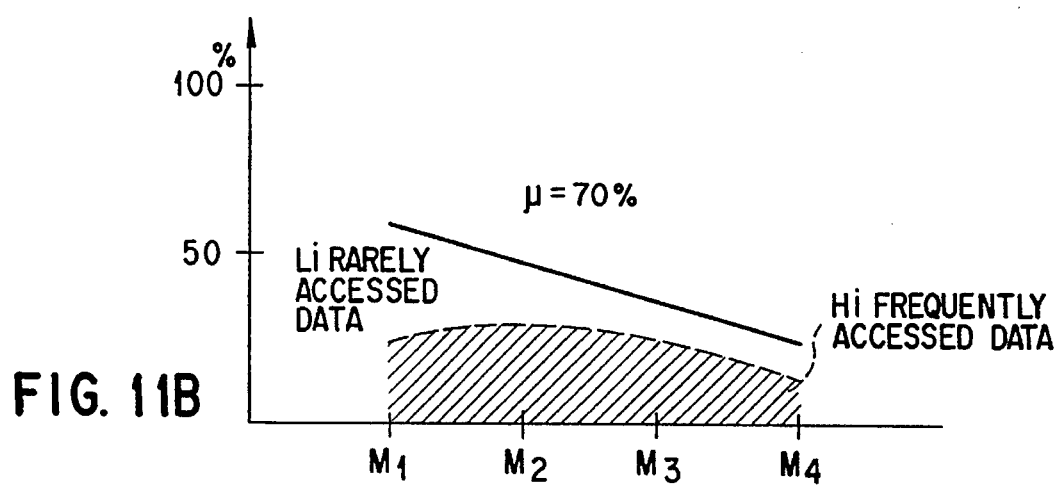
Figure 11C:
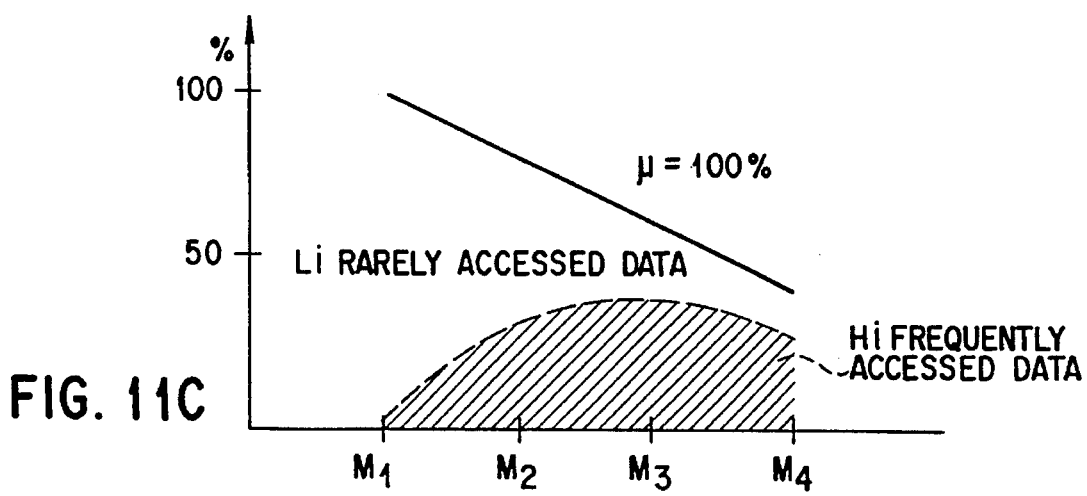

FIGS. 11A to 11C show how data are stored in accordance with the functions f and g. In the respective states shown in FIGS. 11A to 11C, Hi and Li of each medium change in accordance with μ. FIG. 11A shows a state wherein μ is about 20%. FIG. 11B shows a state wherein μ is about 70%. FIG. 11C shows a state wherein μ is about 100%.

Management of data such as access frequency data is performed by using a data management table shown in, c.g., FIG. 8. For example, "access frequency" is expressed as the number of times of access per unit time, the time different between the latest access time point and the current time point, or a value obtained by a weighting operation using the two values.

A state determined by sorting the data of the table shown in FIG. 8 at a given time point in accordance with the access frequencies and calculating equations (1) to (14) is compared with a state determined by the same processing after the lapse of a certain period of time. If the comparison result indicates a difference exceeding a predetermined value, flags necessary for migration are set in change flag portions in FIG. 8 to perform migration with respect to data which are required to be moved between media. These flags include a distributed relocation flag 21, and a centralized relocation flag 22, and a media update flag 23. Thereafter, migration is actually executed by the relocating sections 101 and 102. When μ=1 (100%), a media update flag is turned on with respect to the data stored in the medium M1. After replacement of the medium M1, information associated with the corresponding loaded medium is erased from the management table, and is moved to a management table of non-loaded media, which is similar to the one shown in FIG. 8.

FIGS. 12 to 17 are flow charts showing the operations of the sections 101 to 104. In the processing shown in FIG. 12, which is performed by the access frequency management section 104, the access frequencies of the respective data and the total amount of stored data are sequentially re-evaluated to calculate a capacity distribution ratio. As a result, change flags (the distributed relocation flag 21, the centralized relocation flag 22, and the media update flag 23) are set with respect to data requiring migration.

Figure 12:
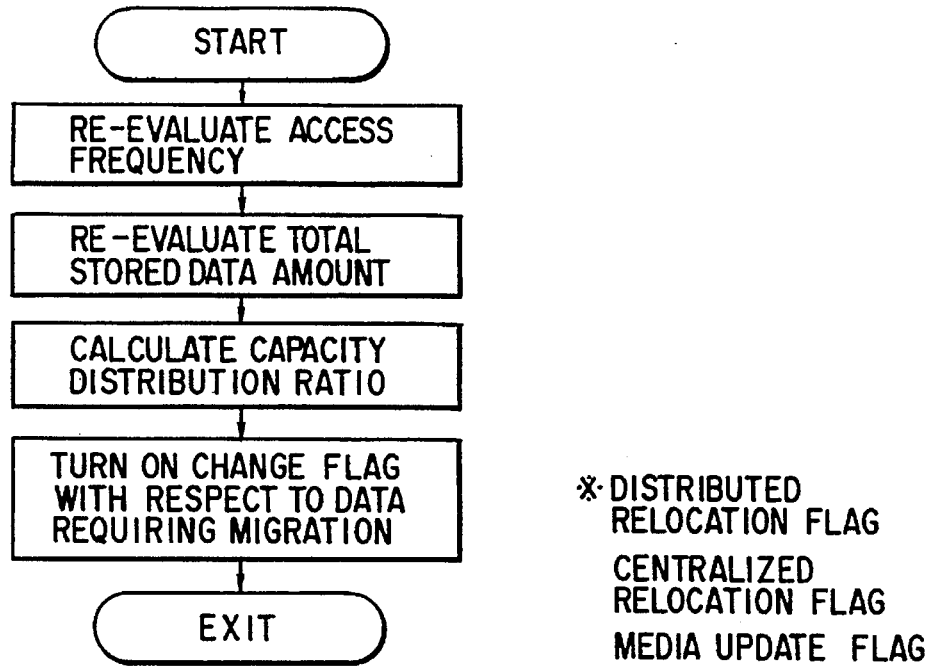
FIG. 12 is a flow chart showing the operation of an access frequency management section.
Figure 13:
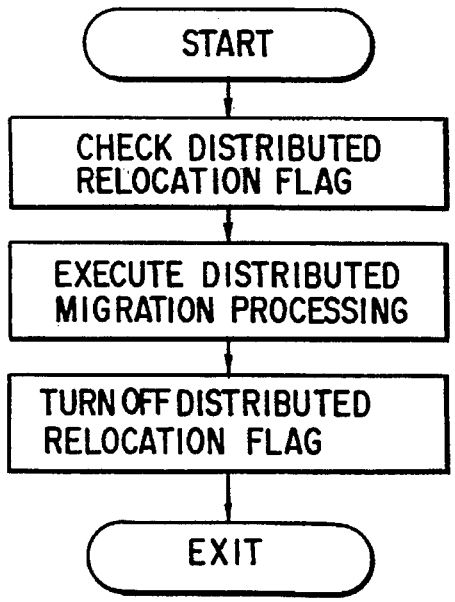
FIG. 13 is a flow chart showing the operation of a distributed relocation section.

In the processing shown in FIG. 13, which is performed by the distributed relocation section 101, the distributed relocation flag of the flags set by the processing shown in FIG. 12 is checked. If this flag is on, distributed migration processing is executed. Upon completion of the processing, the distributed relocation flag is turned off.

In the processing shown in FIG. 14, which is performed by the centralized relocation section 102, the centralized relocation flag of the flags set by the processing shown in FIG. 12 is checked. If this flag is on, centralized migration processing is performed with respect to a predetermined medium. Upon completion of the processing, the centralized relocation flag is turned off.

In the processing shown in FIG. 15, which is performed by the media update control section 103, the media update flag of the flags set by the processing shown in FIG. 12 is checked. If this flag is on, the processing for removing the corresponding medium is executed. Thereafter, data management information associated with the removed medium is erased from the management table shown in FIG. 8. A new medium is loaded, and management information associated with the loaded medium is written in the table.

Figure 16:
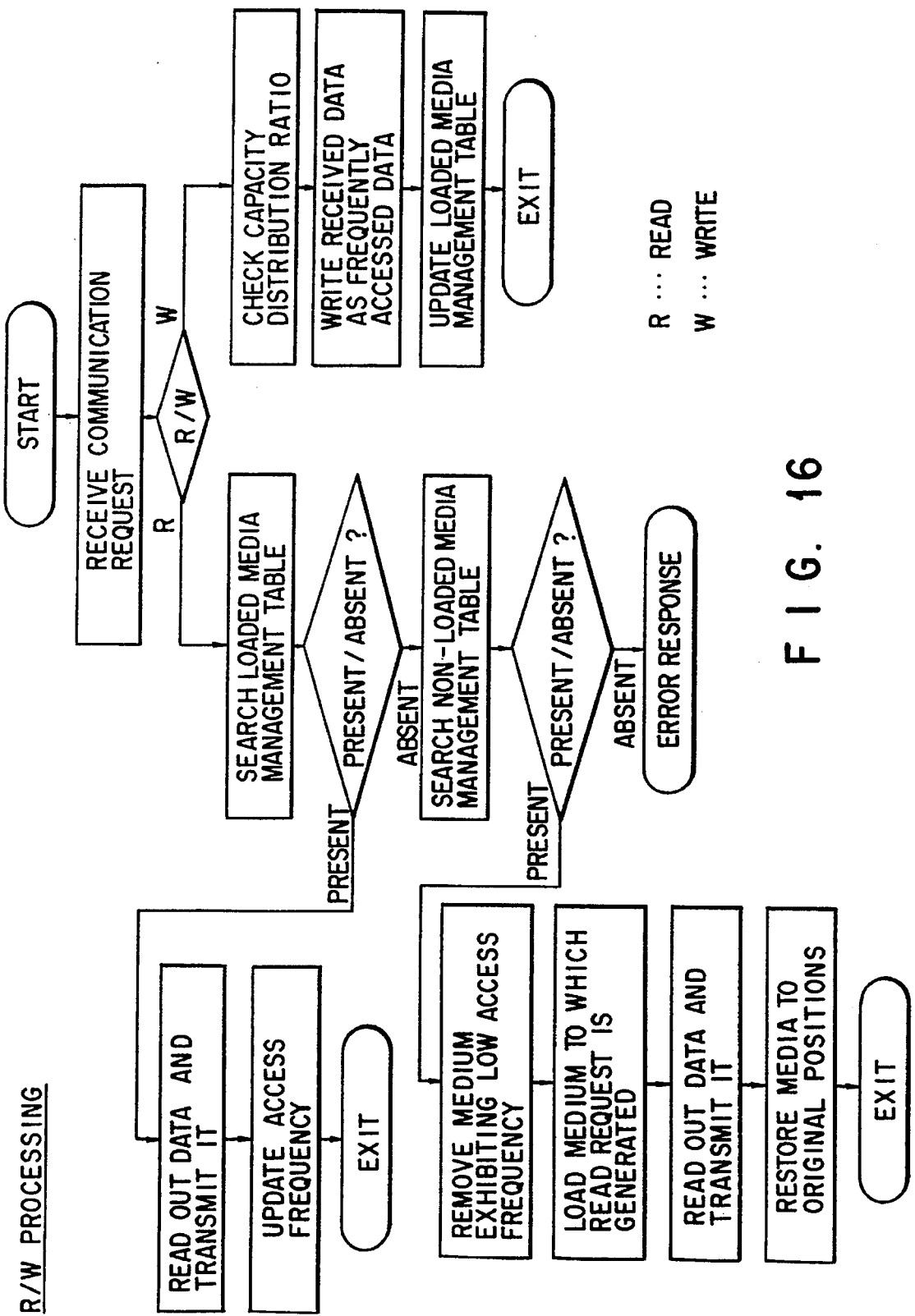
FIG. 16 is a flow chart showing the operation of a communication processing control section.

In the processing shown in FIG. 16, which is performed by the communication processing control section 112, when a data read command is received from an external unit, it is checked first by searching the loaded media management table whether the corresponding data is stored in any of the media loaded in the media drives. If the data is stored in any of the loaded media, the data is read out from the corresponding medium and transferred to the external unit. At this time, the access frequency associated with the readout data in the management table is updated.

If it is determined by searching the loaded media management table that the data requested from the external unit is not stored in any of the loaded media, the non-loaded management table is searched. If the non-loaded media management table indicates the presence of the corresponding data, the loaded rarely accessed medium is removed, and the medium in which the data is stored is loaded. Thereafter, the data is read out from the medium and transferred to the external unit. The previously removed medium is loaded in the corresponding drive. If the requested data is not found after searching the non-loaded media management table, an error response is transmitted to the external unit.

When a write command is received from an external unit, the capacity distribution ratio of each medium is checked, and externally input data is written, as frequently accessed data, in a proper medium. Information associated with the written data is stored in the loaded media management table to update the loaded media management table.

FIGS. 17A to 17C are flow charts showing the operations of the file server control processing section 121, a relocation control section 122, and an R/W processing section 123. As shown in FIG. 17A, the file server control processing section 121 normally performs maintenance processing of the overall system. However, as shown in FIG. 17B, the file server control processing section 121 performs communication processing when a communication interrupt occurs, and performs R/W processing when an R/W request is generated. If no R/W request is generated, the file server control processing section 121 performs the processing shown in FIG. 16. As shown in 17C, when a timer interrupt occurs, the file server control processing section 121 performs the processing shown in FIG. 12. In this case, the file server control processing section 121 compares the current contents of the management table with the previous contents of the management table. If it is determined that no change has occurred, the flow returns to the system maintenance processing shown in FIG. 17A. If there is a change in the contents of the management table, distributed relocation processing, centralized relocation processing, or medium replacement processing is performed in accordance with the change.

In such processing, when new data is stored, the access frequency of the data is evaluated. Data evaluated as rarely accessed data is processed as rarely accessed data, whereas data evaluated as frequently accessed data is processed as frequently accessed data. In general, latest data is treated as frequently accessed data because the possibility that the data is accessed again in the near future is high. In this case, sequentially received data may be stored in the respective media according to the following storage formula:

H1: H2: H3: . . . : Hn

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An information processing apparatus having a plurality of disk drives for portable information storing disks, and executing data accesses to a plurality of disks loaded in said disk drives, said apparatus comprising:

calculating means for calculating access frequencies of data stored in each of said plurality of disks;

access frequency memory means for storing access frequency of each data calculated by said calculating means;

means for identifying each of said data stored in said access frequency memory means as one of low access frequency data and high access frequency data;

first flag setting means for reevaluating at given intervals the access frequency of each data stored in said access frequency memory means, and for setting a centralized relocation flag for said low access frequency data which are to be relocated to a specific disk;

second flag setting means for reevaluating at given intervals the access frequency of each data stored in said access frequency memory means, and for setting a distribution relocation flag for said high access frequency data which are to be distributed on said plurality of disks;

low access frequency data relocating means for checking said centralized relocation flag set by said first flag setting means, and for distributing to said plurality of disks low access frequency data having the centralized relocation flag set, in accordance with a first distribution ratio; and high access frequency data relocating means for checking said distributed relocation flag set by said second flag setting means, and for distributing to said plurality of disks high access frequency data having the distributed relocation flag set, in accordance with a second distribution ratio.

2. An apparatus according to claim 1 wherein said low access frequency data relocating means includes means for relocating low access frequency data such that when said specific disk is full, it is filled only with low access frequency data.

3. An apparatus according to claim 1, wherein, when said specific disk is represented by M1, said plurality of disks are represented by M1 to Mn+1, the ratio of current total data amount to a total storage amount of said apparatus with said specific disk being full is represented as $\mu$, said low access frequency data relocating means includes means for calculating said first distribution ratio as a linear function for always setting ratios of the low access frequency data of disk M1 to be $\mu$ and the low access frequency data of disk Mn+1 to be zero.

4. An apparatus according to claim 1 further comprising means for removing said specific disk from said disk drive thereof when said specific disk is re-stored only with said low access frequency data.

5. An apparatus according to claim 1 wherein, when said specific disk is represented by M1, said plurality of disks are represented by M1 to Mn, a new disk to be loaded into one of said disk drives is represented by Mn+1 and a ratio of the current total data amount to a total storage amount of said apparatus with said specific disk being full is represented by $\mu$, said high access frequency data relocating means includes means for calculating said second distribution ratio as a linear function for always setting ratios of high access frequency data of disk M1 to be $(1-\mu)$ and ratios of high access frequency data of disk Mn+1 to be 1.

* * * * *